United States Patent
So et al.

(10) Patent No.: US 10,560,514 B2
(45) Date of Patent: Feb. 11, 2020

(54) APPARATUS AND METHOD FOR TRANSMITTING AND RECEIVING INFORMATION RELATED TO MULTIMEDIA DATA IN A HYBRID NETWORK AND STRUCTURE THEREOF

(71) Applicant: Samsung Electronics Co., Ltd., Suwon-si, Gyeonggi-do (KR)

(72) Inventors: Young-Wan So, Gunpo-si (KR); Kyung-Mo Park, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 63 days.

(21) Appl. No.: 14/671,359

(22) Filed: Mar. 27, 2015

(65) Prior Publication Data
US 2015/0281304 A1    Oct. 1, 2015

(30) Foreign Application Priority Data

Mar. 29, 2014  (KR) .................. 10-2014-0037341
Jul. 4, 2014  (KR) .................. 10-2014-0083988

(51) Int. Cl.
*H04L 29/08*  (2006.01)
*H04L 1/00*  (2006.01)
(Continued)

(52) U.S. Cl.
CPC ............ *H04L 67/10* (2013.01); *H04L 1/0001* (2013.01); *H04L 1/0026* (2013.01); *H04L 29/06* (2013.01);
(Continued)

(58) Field of Classification Search
CPC ..... H04L 65/80; H04L 47/365; H04L 47/628; H04L 45/121; H04L 45/125;
(Continued)

(56) References Cited

U.S. PATENT DOCUMENTS 8,640,229 B1* 1/2014 Riegel .................. H04L 9/3242
726/20
2002/0041570 A1* 4/2002 Ptasinski ............... H04L 1/0003
370/252

(Continued)

FOREIGN PATENT DOCUMENTS

CA    2 871 578 A1    10/2013
CA    2 872 506 A1    11/2013
(Continued)

OTHER PUBLICATIONS

Anonymous: Text of ISO/IEC 2nd CD 23008-1 MPEG Media Transport, 103. MPEG Meeting; Jan. 21, 2013-Jan. 25, 2013; Geneva; (Motion Picture Expert Group or ISO/IEC JTC1/SC29/WG11) No. N13293, Feb. 12, 2013, XP030020043.

(Continued)

*Primary Examiner* — Barbara B Anyan
(74) *Attorney, Agent, or Firm* — Jefferson IP Law, LLP

(57) ABSTRACT

An apparatus and method for transmitting and receiving information related to multimedia data in a hybrid network and a structure thereof are provided. The transmission method includes generating transmission characteristic information about the media data, and transmitting the transmission characteristic information. The transmission characteristic information includes valid range information about the transmission characteristic information.

3 Claims, 2 Drawing Sheets

(51) Int. Cl.
*H04L 29/06* (2006.01)
*H04N 7/173* (2011.01)
*H04N 21/2343* (2011.01)

(52) U.S. Cl.
CPC . *H04N 7/17336* (2013.01); *H04N 21/234327* (2013.01)

(58) Field of Classification Search
CPC ... H04L 1/0002; H04L 1/0033; H04L 1/0075; H04L 1/1867
See application file for complete search history.

(56) References Cited

U.S. PATENT DOCUMENTS

| | | | | |
|---|---|---|---|---|
| 2003/0018794 | A1* | 1/2003 | Zhang | H04L 29/06 709/231 |
| 2003/0088876 | A1* | 5/2003 | Mao | H04N 7/17336 725/91 |
| 2010/0189182 | A1* | 7/2010 | Hannuksela | H04N 21/23432 375/240.25 |
| 2010/0223357 | A1* | 9/2010 | Einarsson | H04L 29/06027 709/219 |
| 2011/0305209 | A1* | 12/2011 | Merlin | H04L 1/0001 370/329 |
| 2012/0324521 | A1 | 12/2012 | Rhyu et al. | |
| 2013/0086213 | A1 | 4/2013 | Rhyu et al. | |
| 2013/0094563 | A1 | 4/2013 | Bae | |
| 2013/0136193 | A1 | 5/2013 | Hwang et al. | |
| 2013/0305304 | A1 | 11/2013 | Hwang et al. | |
| 2014/0023071 | A1 | 1/2014 | Park et al. | |
| 2014/0049694 | A1* | 2/2014 | Bhaskaran | G06T 7/0002 348/607 |
| 2014/0334381 | A1* | 11/2014 | Subramaniam | H04L 65/604 370/328 |
| 2014/0334504 | A1 | 11/2014 | Yie et al. | |
| 2014/0344875 | A1 | 11/2014 | Bae | |
| 2015/0043519 | A1* | 2/2015 | Hui | H04W 72/0446 370/330 |
| 2015/0092698 | A1* | 4/2015 | Seo | H04L 1/0026 370/329 |
| 2015/0113577 | A1 | 4/2015 | Yie et al. | |
| 2015/0156814 | A1* | 6/2015 | Yie | H04W 80/06 370/329 |

FOREIGN PATENT DOCUMENTS

| | | |
|---|---|---|
| CN | 103430559 A | 12/2013 |
| EP | 2667622 A2 | 11/2013 |
| JP | 2014-033423 A | 2/2014 |
| JP | 2014-507878 A | 3/2014 |
| KR | 10-2013-0085987 A | 7/2013 |
| WO | 2013/048148 A2 | 4/2013 |
| WO | 2013/077697 A1 | 5/2013 |
| WO | 2013/169084 A1 | 11/2013 |

OTHER PUBLICATIONS

Chinese Office Action dated Aug. 28, 2018.
Japanese Office Action dated Jul. 28, 2018.

* cited by examiner

APPARATUS AND METHOD FOR TRANSMITTING AND RECEIVING INFORMATION RELATED TO MULTIMEDIA DATA IN A HYBRID NETWORK AND STRUCTURE THEREOF

CROSS-REFERENCE TO RELATED APPLICATION(S)

This application claims the benefit under 35 U.S.C. § 119(a) of a Korean patent application filed on Mar. 29, 2014 in the Korean Intellectual Property Office and assigned Serial number 10-2014-0037341, and of a Korean patent application filed on Jul. 4, 2014 in the Korean Intellectual Property Office and assigned Serial number 10-2014-0083988, the entire disclosure of each of which is hereby incorporated by reference.

TECHNICAL FIELD

The present disclosure relates to an apparatus and method for transmitting and receiving information related to multimedia data in a hybrid network and a structure thereof.

BACKGROUND

A hybrid network that allows simultaneous connection to a broadcasting network and a communication network and a Moving Picture Experts Group (MPEG) Media Transport (MMT) technology for providing hybrid content of multimedia data, applications, and files are under consideration for a recent multimedia service.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a structure of valid range information about multimedia data-related information.

Another aspect of the present disclosure is to provide a method and apparatus for transmitting valid range information about multimedia data-related information.

In accordance with an aspect of the present disclosure, a method for transmitting information about media data is provided. The method includes generating transmission characteristic information about the media data, and transmitting the transmission characteristic information. The transmission characteristic information includes valid range information about the transmission characteristic information.

In accordance with another aspect of the present disclosure, an apparatus for transmitting information about media data is provided. The apparatus includes a transmission characteristic information generator configured to generate transmission characteristic information about the media data, and a transmitter configured to transmit the transmission characteristic information. The transmission characteristic information includes valid range information about the transmission characteristic information.

In accordance with another aspect of the present disclosure, a method for receiving information about media data is provided. The method includes receiving transmission characteristic information about the media data, and detecting the transmission characteristic information. The transmission characteristic information includes valid range information about the transmission characteristic information.

In accordance with another aspect of the present disclosure, an apparatus for receiving information about media data is provided. The apparatus includes a receiver configured to receive transmission characteristic information about the media data, and a detector configured to detect the transmission characteristic information. The transmission characteristic information includes valid range information about the transmission characteristic information.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The basic concept of embodiments of the present disclosure lies in that valid range information is signaled to indicate a valid range of information related to multimedia data. The valid range information may be represented in terms of time, media data, or transmission packet. Herein below, the terms 'time' and 'time domain' are interchangeably used in the same meaning. Likewise, the terms 'media data' and 'media (data) domain' are interchangeably used in the same meaning and the terms 'transmission packet' and 'packet domain' are interchangeably used in the same meaning.

The following description will be given of the above basic concept in the context of a Moving Picture Experts Group (MPEG) Media Transport (MMT) system. However, this is purely exemplary and thus it is to be understood that the embodiments of the present disclosure are not limited to the MMT system.

Specifically, the embodiments of the present disclosure provide a method for transmitting valid range information about Asset Delivery Characteristics (ADC) (or transport characteristic information) that specify transmission characteristics of an MMT asset in an MMT system.

Figure 1:
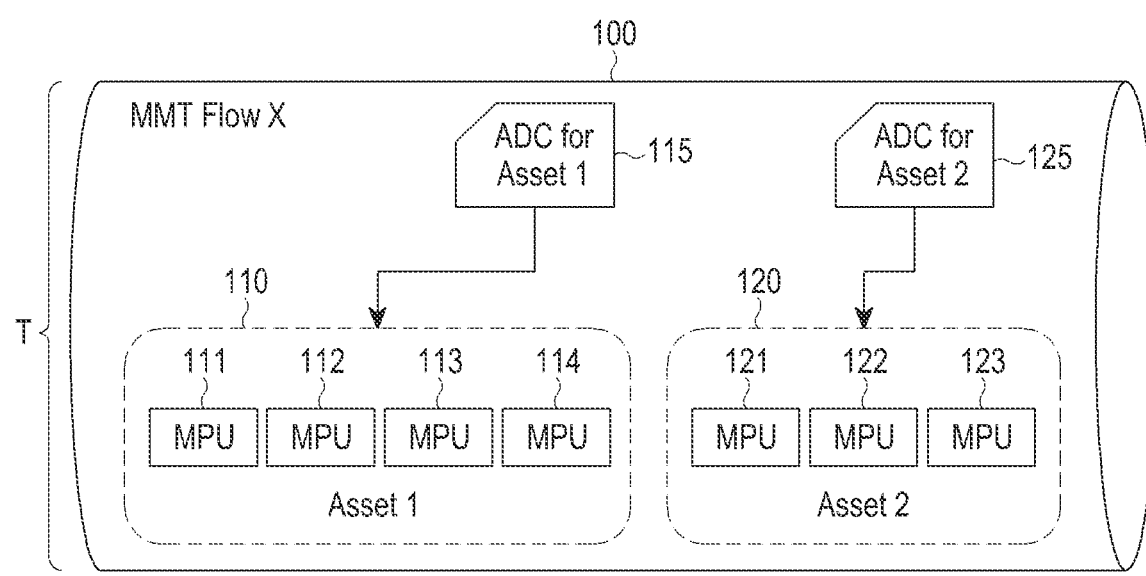
FIG. 1 illustrates a Moving Picture Experts Group (MPEG) Media Transport (MMT) flow including MMT assets, Media Processing Units (MPUs), and Asset Delivery Characteristics (ADC) according to an embodiment of the present disclosure.

FIG. 1 illustrates an MMT flow including MMT assets, Media Processing Units (MPUs), and ADC according to an embodiment of the present disclosure.

In an MMT system, a set of encoded media data and its related metadata are defined as an MMT flow called a package 100.

The package 100 includes one or more MMT assets 110 and 120. An MMT asset refers to multimedia data that may be used in generating a multimedia presentation such as video, audio, text, a file, or the like. For example, in regard to a movie, a package for movie content with title "A" may include a video asset of A, an audio asset of A, and a text asset of A.

Each of the MMT assets 110 and 120 includes at least one MPU. In FIG. 1, the first MMT asset (MMT asset 1) 110 includes four MPUs 111, 112, 113, and 114 and the second MMT asset (MMT asset 2) 120 includes three MPUs 121, 122, and 123. An MPU is a unit for processing an MMT stream independently. For example, an MMT transmission entity divides data into MPUs and processes the MPUs, and an MMT reception entity receives the data in MPUs and processes the MPUs, for data recovery.

The package 100 includes ADC (or transport characteristic information) for each MMT asset to provide the transmission characteristics of the MMT asset. Specifically, ADC 115 indicates the transmission characteristics of MMT asset 1 110 and ADC 125 indicates the transmission characteristics of MMT asset 2 120. ADC information may be for one MPU, not for an asset, under circumstances, which will be described in detail in a first embodiment of the present disclosure.

Now a detailed description will be given of the structure of ADC information according to an embodiment of the present disclosure.

According to an embodiment of the present disclosure, the ADC information includes 'valid range information' indicating a valid range for data. Accordingly, the ADC information may indicate its valid range by including time-domain valid period information (first and fourth embodiments), media-domain MPU sequence number information (a second embodiment), or packet-domain packet sequence number information (a third embodiment).

Embodiment 1

According to the first embodiment of the present disclosure, ADC information includes information about a valid period of the ADC information in the time domain.

Specifically, to indicate how long the ADC information is valid (e.g., a valid period of the ADC information), the ADC information may include 'Validity_start_time' information and 'Validity_duration' information. The Validity_start_time information indicates a time when the (updated) ADC information starts to be valid and the Validity_duration information indicates a time period during which the (updated) ADC information is valid.

If the ADC information includes the ADC valid range information in the time domain, a Media Aware Network Element (MANE) or an MMT reception entity, which is an intermediate node, advantageously detects the ADC valid range information without the need for receiving all other MPUs or all other information, just by extracting a signaling message from a received MMT flow and extracting only ADC from the signaling message.

Once the MANE or the MMT reception entity receives the Validity_start_time information and the Validity_duration information, the MANE or the MMT reception entity does not need to necessarily receive new ADC information during a time period indicated by the Validity_duration information. After the time period indicated by the Validity_duration information elapses, the MANE or the MMT reception entity may acquire new ADC information by receiving a new MMTP packet and detecting updated ADC in the new MMTP packet. Accordingly, if the ADC valid range information in the time domain is included in the ADC information, it is easy to determine the valid range of the ADC. However, when the time-domain valid range information is provided, the ADC information itself may become incorrect if traffic characteristics are distorted due to external factors such as packet loss or a bottleneck while the MMT flow is passing through intermediate nodes of another network. The intermediate node 220 may be a router or a MANE.

When needed, only the Validity_duration information without the Validity_start_time information may be included in the ADC information. In this case, the MANE or the MMT reception entity may set that the ADC information is valid during the time period indicated by the Validity_duration information after a time point indicated by a time stamp using time stamp information included in an MMT packet header having the ADC information.

In other words, if only the Validity_duration information without the Validity_start_time information is included in the ADC information, the time stamp information in the MMTP packet header having the ADC information may serve as the Validity_start_time information.

In addition to the Validity_start_time information and/or the Validity_duration information, the ADC information may include ADC_level_flag information. The ADC_level_flag information is 1-bit flag information indicating whether the ADC information is for an asset or an MPU. The ADC information may be transmitted on an asset basis or on an MPU basis, in consideration of the size of the ADC information. Therefore, whether the ADC information includes information for an asset or information for an MPU may be indicated by the ADC_level_flag information. For example, if 'ADC_level_flag' is set to '0', the ADC signaling message includes information for an asset. On the other hand, if 'ADC_level_flag' is set to '1', the ADC signaling message includes information for one MPU.

Table 1 below illustrates an example of ADC information including ADC valid range information in the time domain according to the first embodiment of the present disclosure.

TABLE 1

| Syntax | Value | No. of bits | Mnemonic |
|---|---|---|---|
| ADC_message ( ) { | | | |
| message_id | | 16 | uimsbf |
| version | | 8 | uimsbf |
| length | | 32 | uimsbf |
| Validity_start_time | | 32 | uimsbf |
| Validity_duration | | 32 | uimsbf |
| message_payload { | | | |
|   ADC_level_flag | | 1 | boolean |
|   if (ADC_level_flag == 1){ | | | |
|     MPU_sequence_number | | 32 | uimsbf |
|   } | | | |
|   packet_id | | 16 | uimsbf |
|   qos_descriptor{ | | | |
|     loss_tolerance | | 8 | uimsbf |
|     jitter_sensitivity | | 8 | uimsbf |
|     class_of_service | | 1 | bslbf |
|     bidirection_indicator | | 1 | bslbf |
|   } | | | |
|   if (class_of_service == 1) | | | |
|   bitstream_descriptor_vbr{ | | | |
|     flow_label | | 7 | uimsbf |
|     sustainable_rate | | 16 | uimsbf |
|     buffer_size | | 16 | uimsbf |
|     peak_rate | | 16 | uimsbf |
|     max_MFU_size | | 8 | uimsbf |
|     mfu_period | | 8 | uimsbf |
|   }else | | | |
|   bitstream_descriptor_cbr{ | | | |
|     flow_label | | 7 | uimsbf |
|     peak_rate | | 16 | uimsbf |
|     max_MFU_size | | 8 | uimsbf |
|     mfu_period | | 8 | uimsbf |
|   } | | | |
| } | | | |
| } | | | |

Each message element of Table 1 has the following meaning.

Message_id: indicates the IDentifier (ID) of an ADC message.

Version: indicates the version of the ADC message.

Length: a 32-bit field indicating the length of the ADC message in bytes, counting from the beginning of the next field to the last byte of the ADC message. The value '0' is not valid for this field.

Loss_tolerance: indicates required loss tolerance of an asset for delivery. The value of the loss_tolerance attribute is listed in a predetermined table.

Jitter_sensitivity: indicates a required jitter level of an underlying delivery network for end-to-end asset delivery. The value of jitter_sensitivity attribute is listed in a predetermined table.

Class_of_service: classifies services into different classes and manages each type of bit stream in a particular way. For example, the MANE may manage each type of bit stream in a particular way. This field indicates the type of a bit stream attribute.

Bitdirection_indicator: if it is set to '1', bidirectional delivery is required. If it is set to '0', bidirectional delivery is not required.

Bistrem_descriptorVBRType: if class_of_service is '1', "Bitstream_descriptorVBRType" shall be used for "Bitstream_descriptorType".

Bitstream_descriptorCBRType: when class_of_service is '0', "Bitstream_descriptorCBRType" shall be used for "Bitstream_descriptorType".

sustainable_rate: defines the minimum bitrate that shall be guaranteed for continuous delivery of the asset. The sustainable_rate corresponds to a drain rate in a token bucket model. The sustainable_rate is expressed in bytes per second.

buffer_size: defines a maximum buffer size for delivery of the asset. The buffer absorbs an excess instantaneous bit rate higher than the sustainable_rate and the buffer_size shall be large enough to avoid overflow. The buffer_size corresponds to a bucket depth in the token bucket model. Buffer_size of a Constant Bit Rate (CBR) asset shall be zero. The buffer_size is expressed in bytes.

peak_rate: defines a peak bit rate during continuous delivery of the asset. The peak_rate is the highest bit rate during every MFU_period. The peak_rate is expressed in bytes per second.

MFU_period: defines a period of MFUs during continuous delivery of the asset. The MFU_period is measured as a time interval of sending time between the first bytes of two consecutive MFUs. The MFU_period is expressed in milliseconds.

max_MFU_size: indicates a maximum size of an MFU, which is MFU_period*peak_rate. The max_MFU_size is expressed in bytes.

flow_label (7 bits): indicates a flow ID. The application may perform per-flow Quality of Service (QoS) operations in which network resources are temporarily reserved during a session. A flow is defined to be a bit stream or a group of bit streams whose network resources are reserved according to transport characteristics or ADC in a package. It is an implicit serial number from '0' to '127'. An arbitrary number is assigned temporarily during a session and refers to every individual flow for which a decoder (processor) is assigned and network resources could be reserved.

packet_id (16 bits): This field is an integer value that can be used to distinguish one asset from another. The value of this field is derived from the asset_id of the asset to which this packet belongs. The mapping between the packet_id and the asset_id is signaled by an MMT package table as part of a signaling message. Separate values will be assigned to signaling messages and Forward Error Correction (FEC) repair flows. The packet_id is unique throughout the lifetime of the delivery session and for all MMT flows delivered by the same MMT transmission entity. For AL-FEC, the mapping between packet_id and the FEC repair flow is provided in an AL-FEC message.

ADC_level_flag (1 bit): indicates whether included ADC information is for an asset or for a MPU. If it is set to '0', an ADC signaling message includes ADC information for an asset. If it is set to '1', the ADC signaling message includes ADC information for a single MPU.

Validity_start_time (32 bits): indicates a time when an updated ADC message starts to be valid.

Validity_duration (32 bits): indicates the valid period of the included ADC information in milliseconds.

For example, "Validity_start_time (32 bits)" indicates a time point when the ADC information starts to be valid and "Validity_duration (32 bits)" indicates the valid period of the included ADC information in milliseconds.

Embodiment 2

According to a second embodiment of the present disclosure, valid MPU sequence number information for ADC is included as ADC valid range information in ADC information. For example, "valid MPU sequence information" is included in the ADC information.

Specifically, the valid MPU sequence information includes "Valid_MPU_Sequence_Start_Number" and/or "Valid_MPU_Sequence_End_Number".

"Valid_MPU_Sequence_Start_Number" indicates an MPU sequence number at which the ADC information starts to be valid and "Valid_MPU_Sequence_End_Number" indicates an MPU sequence number at which the validity of the ADC information ends. For example, information indicating the start and end of MPU sequence numbers to which the ADC information is applied is included in the ADC information, thereby indicating the valid range of the ADC.

Upon receipt of this information, the MANE or the MMT reception entity may determine ADC of an MPU from MPU sequence numbers included in payload headers of received MMT packets. Or an MPU is recovered from received MMT packets and the ADC of the MPU may be determined from MPU_Sequence_number included in an MPU box of the MPU.

If ADC valid range information is included in the media domain, an MPU for which the ADC information is may be explicitly indicated. Accordingly, even though traffic characteristics described by the ADC information are different from real traffic characteristics due to factors such as a bottleneck in a network, the difference is not large.

On the other hand, if a media service provider sets a large MPU size and thus a small number of MPUs are included in one asset, it may be difficult to provide precise ADC information.

However, only "Valid_MPU_Sequence_End_Number" without "Valid_MPU_Sequence_Start_Number" may be included in the ADC information under circumstances. In this case, after the MANE receives the ADC information, it may determine that the ADC information is valid until a time indicated by Valid_MPU_Sequence_End_Number". The corresponding information may be meaningful only when the transmission order of the ADC information and the MPU is not changed.

Table 2 below illustrates an example of ADC information including media-domain ADC valid range information according to the second embodiment of the present disclosure.

TABLE 2

| Syntax | Value | No. of bits | Mnemonic |
|---|---|---|---|
| ADC_message ( ) { | | | |
| message_id | | 16 | uimsbf |
| version | | 8 | uimsbf |
| length | | 32 | uimsbf |
| Valid_MPU_Sequence_Start_Number | | 32 | uimsbf |
| Valid_MPU_Sequence_End_Number | | 32 | uimsbf |
| message_payload { | | | |
|     ADC_level_flag | | 1 | boolean |
|     if (ADC_level_flag == 1){ | | | |
|         MPU_sequence_number | | 32 | uimsbf |
|     } | | | |
|     packet_id | | 16 | uimsbf |
|     qos_descriptor{ | | | |
| loss_tolerance | | 8 | uimsbf |
| jitter_sensitivity | | 8 | uimsbf |
| class_of_service | | 1 | bslbf |
| bidirection_indicator | | 1 | bslbf |
|     } | | | |
|     if (class_of_service == 1) | | | |
| bitstream_descriptor_vbr{ | | | |
| flow_label | | 7 | uimsbf |

TABLE 2-continued

| Syntax | Value | No. of bits | Mnemonic |
|---|---|---|---|
| sustainable_rate | | 16 | uimsbf |
| buffer_size | | 16 | uimsbf |
| peak_rate | | 16 | uimsbf |
| max_MFU_size | | 8 | uimsbf |
| mfu_period | | 8 | uimsbf |
|     }else | | | |
| bitstream_descriptor_cbr{ | | | |
| flow_label | | 7 | uimsbf |
| peak_rate | | 16 | uimsbf |
| max_MFU_size | | 8 | uimsbf |
| mfu_period | | 8 | uimsbf |
|     } | | | |
| } | | | |
| } | | | |

"Valid_MPU_Sequence_Start_Number (32 bits)" indicates an MPU sequence number at which the ADC information starts to be valid and "Valid_MPU_Sequence_End_Number (32 bits)" indicates an MPU sequence number at which the validity of the ADC information ends.

Embodiment 3

According to a third embodiment of the present disclosure, information about MMT packet sequence numbers valid for ADC in the MMT packet domain is included as ADC valid range information in ADC information. For example, "valid packet sequence information" is included in the ADC information. Specifically, the valid packet sequence information includes "Valid_packet_Sequence_Start_Number" and/or "Valid_packet_Sequence_End_Number".

"Valid_packet_Sequence_Start_Number" indicates the sequence number of a packet in which the ADC information starts to be valid and "Valid_packet_Sequence_End_Number" indicates the sequence number of a packet in which the validity of the ADC information ends. For example, the valid range of the ADC may be indicated by including information indicating the start and end of packet numbers to which the ADC information is applied in the ADC information.

An intermediate note (for example, the MANE) or the MMT reception entity may determine ADC of received MMT packets using Packet_Sequence_Number included in the packet headers of the MMT packets.

If packet-domain ADC valid range information is included in the ADC information, packets described by the ADC information may be determined by reading packet header information at a packet level. Therefore, the valid range of the ADC may be determined without a particular complex process.

When needed, only "Valid_packet_Sequence_End_Number" without "Valid_packet_Sequence_Start_Number" may be included in the ADC information. In this case, it may be determined that as many packets as ranging from a detected packet with a sequence number in which the ADC is included to a packet with a sequence number indicated by "Valid_packet_Sequence_End_Number" are valid. However, this is possible only when the transmission order of the ADC information and the packets is not changed.

Table 3 below illustrates an example of ADC information including ADC valid range information in the packet domain according to the third embodiment of the present disclosure.

TABLE 3

| Syntax | Value | No. of bits | Mnemonic |
|---|---|---|---|
| ADC_message ( ) { | | | |
| message_id | | 16 | uimsbf |
| version | | 8 | uimsbf |
| length | | 32 | uimsbf |
| Valid_packet_Sequence_Start_Number | | 32 | uimsbf |
| Valid_packet_Sequence_End_Number | | 32 | uimsbf |
| message_payload { | | | |
|     ADC_level_flag | | 1 | boolean |
|     if (ADC_level_flag == 1){ | | | |
|         MPU_sequence_number | | 32 | uimsbf |
|     } | | | |
|     packet_id | | 16 | uimsbf |
|   qos_descriptor{ | | | |
| loss_tolerance | | 8 | uimsbf |
| jitter_sensitivity | | 8 | uimsbf |
| class_of_service | | 1 | bslbf |
| bidirection_indicator | | 1 | bslbf |
|   } | | | |
|     if (class_of_service == 1) | | | |
| bitstream_descriptor_vbr{ | | | |
| flow_label | | 7 | uimsbf |
| sustainable_rate | | 16 | uimsbf |
| buffer_size | | 16 | uimsbf |
| peak_rate | | 16 | uimsbf |
| max_MFU_size | | 8 | uimsbf |
| mfu_period | | 8 | uimsbf |
|     }else | | | |
| bitstream_descriptor_cbr{ | | | |
| flow_label | | 7 | uimsbf |
| peak_rate | | 16 | uimsbf |
| max_MFU_size | | 8 | uimsbf |
| mfu_period | | 8 | uimsbf |
|     } | | | |
| } | | | |
| } | | | |

"Valid_packet_Sequence_Start_Number (32 bits)" indicates a packet sequence number at which the ADC information starts to be valid and "Valid_packet_Sequence_End_Number (32 bits)" indicates a packet sequence number at which the validity of the ADC information ends.

Embodiment 4

A fourth embodiment of the present disclosure is another example of ADC information including ADC valid range information indicating a time-domain ADC valid period.

Specifically, to indicate a time period during which ADC information is valid, parameters "Validity_Start_Time", "Validity_duration in time", and "Next_Update_in_time" may be included in the ADC information. "Validity_Start_Time" indicates a time point when the ADC information starts to be valid and "ADC_Validity_duration" indicates a valid duration of the ADC.

"Validity_Start_Time" and "ADC_Validity_duration" may be represented as 'media-level time' being time points inside a media video or as Wall Clock Time (in Coordinated Universal Time (UTC)).

"Media-level time" means a time inside a medium. For example, if "Validity_Start_Time" is 10 minutes and "ADC_Validity_duration" is 2 minutes for a 1-hour video medium, the valid period of the current ADC spans from 10 minutes to 12 minutes in the 1-hour video medium. On the contrary, UTC is a time standard used in real life. For example, "Validity_Start_Time" may be set to 12:10:0 (hour/min/sec) and "ADC_Validity_duration" may be set to 2 minutes.

If the values of "Validity_Start_Time" and "ADC_Validity_duration" are media-level time, the ADC information may include the "Next_Update_in_time" parameter. "Next_Update_in_time" indicates a wall clock time when updated ADC information next to the current ADC information is to be transmitted or received. "Next_Update_in_time" may be represented as an absolute time value or an offset value indicating a time delay from the transmission time of the current ADC or "Validity_start_Time".

Table 4 below illustrates another example of ADC information including time-domain ADC valid range information according to the fourth embodiment of the present disclosure.

TABLE 4

| Syntax | Value | No. of bits | Mnemonic |
|---|---|---|---|
| ADC_message ( ) { | | | |
| message_id | | 16 | uimsbf |
| version | | 8 | uimsbf |
| length | | 32 | uimsbf |
| message_payload { | | | |
|     ADC_level_flag | | 1 | boolean |
|     if (ADC_level_flag == 1){ | | | |
|         MPU_sequence_number | | 32 | uimsbf |
|     } | | | |
|     packet_id | | 16 | uimsbf |
|   qos_descriptor{ | | | |
| loss_tolerance | | 8 | uimsbf |
| jitter_sensitivity | | 8 | uimsbf |
| class_of_service | | 1 | bslbf |
| bidirection_indicator | | 1 | bslbf |
|   } | | | |
| Next_Update_in_time | | 32 | uimsbf |
| Number_of_timesegments | | 32 | uimsbf |
| for (i=0; i<Number_of_timesegments ;i++){ | | | |
|   Validity_Start_Time | | 32 | uimsbf |
|   Validity_duration_in_time | | 32 | uimsbf |
| | | 32 | uimsbf |
|     if (class_of_service == 1) | | | |
| bitstream_descriptor_vbr{ | | | |
| flow_label | | | |
| sustainable_rate | | 7 | uimsbf |
| buffer_size | | 16 | uimsbf |

TABLE 4-continued

| Syntax | Value | No. of bits | Mnemonic |
|---|---|---|---|
| peak_rate | | 16 | uimsbf |
| max_MFU_size | | 16 | uimsbf |
| mfu_period | | 8 | uimsbf |
| }else | | 8 | uimsbf |
| bitstream_descriptor_cbr{ | | | |
| flow_label | | | |
| peak_rate | | 7 | uimsbf |
| max_MFU_size | | 16 | uimsbf |
| mfu_period | | 8 | uimsbf |
| } | | 8 | uimsbf |
| } | | | |
| } | | | |
| } | | | |

Referring to Table 4, to indicate the valid period of the current ADC information, the ADC information includes "Validity_Start_Time" and "ADC_Validity_duration". Further, the ADC information includes "Next_Update_in_time" to indicate a time when the next ADC information is to be received.

A plurality of pieces of valid period information may be included in the ADC information by time-segmenting "Validity_Start_Time" and "ADC_Validity_duration".

In Table 4, "Number_of_timesegments" specifies the number of time segments defined by "Validity_Start_Time" and "Validity_duration in time" included in the current ADC information. A different ADC value may be applied on a time segment basis. In the example of Table 4, the value of "bitstream_descriptor" may be different for each time segment.

Parameters mapped to the respective time segments defined by "Validity_Start_Time" and "ADC_Validity_duration" may be included as a list in one piece of ADC information. In the example of Table 4, parameters "flow_label", "sustainable_rate", "buffer_size", "peak_rate", "max_MFU_size", and "mfu_period" are mapped to one time segment.

In regard to "Next_Update_in_time" in Table 4, the next ADC information updated after the current ADC information is transmitted a time corresponding to "Next_Update_in_time" after the transmission time of the current ADC information. Therefore, a receiver (for example, the MANE) may receive "Next_Update_in_time" and receive the next ADC information at a time indicated by the value of "Next_Update_in_time".

Embodiment 5

According to a fifth embodiment of the present disclosure, if ADC valid range information is selectively configured for a plurality of media domains, a flag is included in ADC information to indicate a media domain for which the ADC valid range information is.

Specifically, to indicate a media domain for which information about the valid range of ADC is among a plurality of media domains, a "Validity_domain_mode" parameter may be included in ADC information.

Table 5 below illustrates an example of ADC information including the "Validity_domain_mode" parameter according to the fifth embodiment of the present disclosure.

TABLE 5

| Syntax | Value | No. of bits | Mnemonic |
|---|---|---|---|
| ADC_message ( ) { | | | |
| message_id | | 16 | uimsbf |
| version | | 8 | uimsbf |
| length | | 32 | uimsbf |
| Validity_domain_mode | | 2 | uimsbf |
|   if (Validity_domain_mode == 00){ | | | |
|       validity_MPU_sequence_start_number | | 32 | uimsbf |
|      validity_duration_in_MPU | | 32 | uimsbf |
|   Next_Update_in_MPU | | 32 | uimsbf |
|   } | | | |
|   if (Validity_domain_mode == 01){ | | | |
|   validity_start_time | | 32 | uimsbf |
|   validity_duration_in_time | | 32 | uimsbf |
|   Next_Update_in_time | | 32 | uimsbf |
|   } | | | |
| message_payload { | | | |
|   ADC_level_flag | | 1 | uimsbf |
|     if (ADC_level_flag == 1){ | | | |
|       MPU_sequence_number | | 32 | uimsbf |
|     } | | | |
|     packet_id | | 16 | uimsbf |
|   qos_descriptor{ | | | |
|   loss_tolerance | | 8 | uimsbf |
|   jitter_sensitivity | | 8 | uimsbf |
|   class_of_service | | 1 | bslbf |

TABLE 5-continued

| Syntax | Value | No. of bits | Mnemonic |
|---|---|---|---|
| bidirection_indicator | | 1 | bslbf |
| } | | | |
| if (class_of_service == 1) | | | |
| bitstream_descriptor_vbr{ | | | |
| flow_label | | 7 | uimsbf |
| sustainable_rate | | 16 | uimsbf |
| buffer_size | | 16 | uimsbf |
| peak_rate | | 16 | uimsbf |
| max_MFU_size | | 8 | uimsbf |
| mfu_period | | 8 | uimsbf |
| }else | | | |
| bitstream_descriptor_cbr{ | | | |
| flow_label | | 7 | uimsbf |
| peak_rate | | 16 | uimsbf |
| max_MFU_size | | 8 | uimsbf |
| mfu_period | | 8 | uimsbf |
| } | | | |
| } | | | |
| } | | | |

Embodiment 6

According to a sixth embodiment of the present disclosure, guide information indicating an operation to be performed by intermediate nodes receiving an MMT signaling message, for example, MANEs is included in ADC information.

In the sixth embodiment of the present disclosure, to indicate an operation to be performed by MANEs receiving an MMT signaling message, a "Configuration_Type" field may be included in ADC information.

If "Configuration_Type" is set to 0, a MANE receiving the MMT packet forwards the MMT packet to the next node. On the contrary, if "Configuration_Type" is set to 1, the MANE decapsulates the MMT packet, determining that its configuration is to be changed or the MMT packet includes at least information to be referred to, although a final destination of the MMT packet is not the MANE.

The "Configuration_Type" field may be defined in an MMTP packet header. For example, the "Configuration Type" field may be defined in "Pravate_User_Data" of the MMTP packet header.

If the "Configuration_Type" field is included in the MMTP packet header, the MANE may determine the importance of information included in the MMTP packet and the need for decapsulating the MMT packet. Therefore, the MANE does not need to open every MMTP packet and recover it, using the value of the "Configuration_Type" field included in the MMTP packet.

Figure 2:
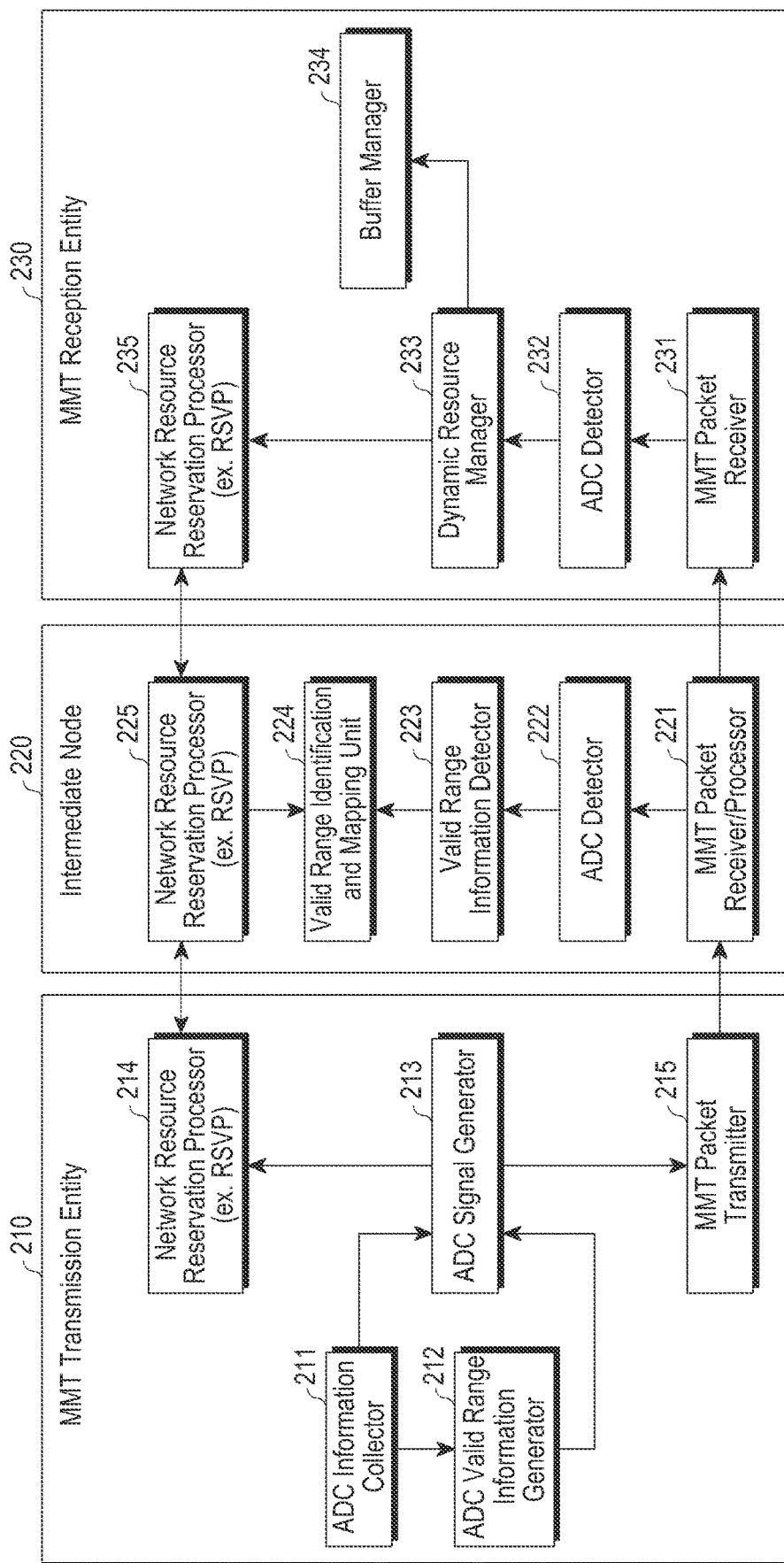
FIG. 2 illustrates operations and structures of an MMT transmission entity, an intermediate node, and an MMT reception entity according to an embodiment of the present disclosure.

FIG. 2 illustrates operations and structures of an MMT transmission entity, an intermediate node, and an MMT reception entity according to an embodiment of the present disclosure.

Referring to FIG. 2, an MMT transmission entity 210 generates and transmits an MMT packet. An intermediate node 220 forwards an MMT packet to an MMT reception entity 230. For the packet forwarding, the intermediate node 220 may reserve network resources, when needed.

First, the structure and operation of the MMT transmission entity 210 will be described below.

The MMT transmission entity 210 includes an ADC information collector 211, an ADC valid range information generator 212, an ADC signal generator 213, a network resource reservation processor 214, and an MMT packet transmitter 215.

The ADC information collector 211 collects ADC information from a content provider or a service provider and provides the collected ADC information to the ADC valid range information generator 212 and the ADC signal generator 213.

The ADC valid range information generator 212 generates ADC valid range information indicating a valid range of ADC using the received ADC information according to embodiments of the present disclosure. As described before, the ADC valid range information may be generated as an indication in the time domain (the first embodiment), in the media domain (the second embodiment), or in the packet domain (the third embodiment).

The ADC signal generator 213 receives the ADC information including traffic characteristic information about a media asset in the time domain from the ADC information collector 211 and appropriately processes the ADC information, for transmission.

The network resource reservation processor 214 processes a Resource Reservation Protocol (RSVP) for transmitting MMT traffic, as an additional protocol that is not defined in the MMT. The MMT packet transmitter 215 transmits an MMT packet including the ADC information.

The structure and operation of the intermediate node 220 will be described.

The intermediate node 220 includes an MMT packet reception processor 221, an ADC detector 222, a valid range information detector 223, a valid range identification and mapping unit 224, and a network resource reservation processor 225.

The MMT packet reception processor 221 receives an MMT packet from the MMT transmission entity 210 and forwards the received MMT packet to the MMT reception entity 230 without processing the MMT packet, or transmits the received MMT packet to the ADC detector 222 according to an embodiment of the present disclosure.

The ADC detector 222 monitors MMT packets that pass through the intermediate node 220 and detects a signaling message including ADC information from the MMT packets. For example, the ADC detector 222 may determine whether a message includes ADC information based on a "Type" field of an MMT packet header and "message_id" of the message. Further, the ADC detector 222 determines whether ADC information needs to be updated and when needed, receives updated ADC. Also, the ADC detector 222 may request ADC information from the MMT transmission entity 210, when needed.

The valid range information detector 223 determines a valid range of ADC from the ADC information detected by the ADC detector 222. Specifically, the valid range information detector 223 detects the valid range of ADC the using an indication of the time domain (the first embodiment), the media domain (the second embodiment), or the packet domain (the third embodiment).

The valid range identification and mapping unit 224 identifies a time-domain, media-domain, or packet-domain indication (e.g., a time, an MPU, or a packet) corresponding to the valid range of specific ADC from the valid range information detected by the valid range information detector 223 and maps the ADC information to the identified indication.

The network resource reservation processor 225 processes then RSVP for transmitting MMT traffic, as an additional protocol that is not defined in the MMT. A network resource allocator (not shown) allocates its network resources to specific traffic.

Finally, the structure and operation of the MMT reception entity 230 will be described below.

The MMT reception entity 230 includes an MMT packet receiver 231, an ADC detector 232, a dynamic resource manager 233, a buffer manager 234, and a network resource reservation processor 235.

The MMT packet receiver 231 receives an MMT packet, processes the received MMT packet, and transmits the processed MMT packet to the ADC detector 232.

The ADC detector 232 monitors received MMT packets and detects a signaling message including ADC information from the MMT packets. For example, the ADC detector 232 may determine whether the message includes ADC information based on a "Type" field of an MMT packet header and "message_id" of the message.

The dynamic resource manager 233 efficiently updates a network resource request, taking into account traffic characteristics based on the detected ADC information. The dynamic resource manager 233 of the MMT reception entity 230 may be used for reference, when the RSRV is performed with the MMT transmission entity 210 (for example, whether update is to be performed and an update level). In addition, the dynamic resource manager 233 may use the ADC information for buffer information to be secured by the MMT reception entity 230. The buffer manager 234 manages a buffer based on the buffer information.

The network resource reservation processor 235 processes the RSVP for transmitting MMT traffic as an additional protocol that is not defined in the MMT.

It will be appreciated that various embodiments of the present disclosure according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present disclosure.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are various embodiments of non-transitory machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a non-transitory machine-readable storage storing such a program.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for transmitting a packet at a moving picture experts group media transport (MMT) transmitting entity in a broadcasting system, the method comprising:
   generating a packet, wherein the packet comprises an asset delivery characteristics (ADC) signaling message including information on ADC; and
   transmitting the packet,
   wherein the ADC signaling message includes validity start time information indicating a time when the ADC signaling message starts to be valid and validity duration information indicating a validity duration of the ADC signaling message from the time indicated by the validity start time information,
   wherein the ADC signaling message further includes ADC level flag information indicating whether the information on the ADC is information for an asset or information for a media processing unit (MPU) included in the asset, and
   wherein the asset includes at least one MPU, an MPU of the at least one MPU representing a data unit for independently decodable media data.

2. The method of claim 1, wherein the ADC signaling message further includes a loss tolerance required for an asset delivery, a jitter sensitivity indicating a jitter level required between the transmitting entity to a receiving entity for the asset delivery, a class of service to manage each of a bitstream based on a predefined scheme, and a bidirection indicator indicating whether a bidirectional delivery is required for the asset delivery.

3. The method of claim 1,
   wherein, if the ADC level flag information is set to a first value, the information on the ADC included in the ADC signaling message is information for the asset, and
   wherein, if the ADC level flag information is set to a second value, the information on the ADC included in the ADC signaling message is information for the MPU included in the asset.

* * * * *